(12) United States Patent
Jun (10) Patent No.: US 7,333,569 B2
(45) Date of Patent: Feb. 19, 2008

(54) DEVICE FOR RECOVERING CARRIER

(75) Inventor: Jung Sig Jun, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 632 days.

(21) Appl. No.: 10/364,354

(22) Filed: Feb. 12, 2003

(65) Prior Publication Data

US 2003/0161414 A1 Aug. 28, 2003

(30) Foreign Application Priority Data

Feb. 27, 2002 (KR) .......................... 10-2002-10567

(51) Int. Cl.
*H04L 27/04* (2006.01)
*H03D 3/24* (2006.01)
(52) U.S. Cl. ...................................... 375/326; 375/327
(58) Field of Classification Search ................ 375/326, 375/324, 316, 327
See application file for complete search history.

(56) References Cited

U.S. PATENT DOCUMENTS 6,151,367 A * 11/2000 Lim ............................ 375/326
6,157,682 A * 12/2000 Oberhammer ............... 375/316
6,222,891 B1 * 4/2001 Liu et al. ..................... 375/326

\* cited by examiner

*Primary Examiner*—Don N. Vo
(74) *Attorney, Agent, or Firm*—Harness, Dickey & Pierce, P.L.C.

(57) ABSTRACT

Device for recovering a carrier including a first mixer for multiplying passband I, and Q signals and a first complex carrier to produce baseband I, Q signals, a filter part for providing pilot components of the baseband I, and Q signals only, a first phase error detector for receiving the pilot component to produce first phase error information, a second mixer for multiplying the passband I, Q signals and a second complex carrier, a second phase error detector for multiplying a difference of samples from the second mixer at first and second time points and a sample at a middle time point of the two samples for producing second phase error information, a loop filter for receiving first and second phase error information and selectively forwarding one of the first and second phase error information, and first, and second oscillators for producing the first and second complex carriers in proportion to an output of the loop filter, and providing to the first and second mixers respectively, thereby minimizing PLL residual jitter characteristics after FPLL convergence.

22 Claims, 5 Drawing Sheets

DEVICE FOR RECOVERING CARRIER

This application claims the benefit of the Korean Application No. P2002-10567 filed on Feb. 27, 2002, which is hereby incorporated by reference.

BACKGROUND OF THE INVENTION

1. Field of the Invention

The present invention relates to a device for recovering a carrier, and more particularly, to a device for recovering a carrier of a digital TV receiver.

2. Background of the Related Art

The VSB (Vestigial SideBand) system, employed as a broadcasting standard in Korea and the USA presently, is designed to transmit a broadcasting signal by using a frequency assigned to existing analog TV broadcasting. However, for minimizing influence to the existing analog TV broadcasting, an intensity of a DTV signal is very low compared to an intensity of an analog TV signal. Of course, the standard is determined such that there is no problem in reception of the DTV signal even if the intensity of the signal is low by using a variety of coding systems in the DTV signal and channel equalizers for reduction of influence from a noise. However, if the signal can not be received properly if a transmission channel condition is very poor. In general, because the DTV transmission system has a merit in that you can watch a picture having no noise at all as noise occurred on the transmission channel is removed perfectly in reception of the broadcasting signal, but has a demerit in that you can not watch the picture at all if you can not recover the transmission signal fully, it is required that the receiver can receive all signals even if the signals have passed through any level of poor transmission channel.

In the meantime, noticeable features of the VSB transmission system suggested from GA compared to other DTV transmission system are the pilot signal, the data segment synchronizing signal, the data segment synchronizing signal, and the field synchronizing signal. Those signals are transmitted from a transmitting part together with the DTV signal for improving characteristics of carrier recovery, timing recovery, and the like.

FPLL (Frequency Phase Locked Loop) is used as the most general algorithm for recovering the carrier, fabrication of which circuit is simple and has an excellent performance to use widely. That is, a carrier recovering part of the FPLL demodulates I, Q signals of a passband from an A/D converter into I, Q signals of a baseband, and locks a frequency and a phase. To do this, the FPLL conducts an FPLL process for removing a frequency difference between a carrier component of a received signal, and a component of reference carrier of the receiver itself, and a PLL (Phase Locked Loop) process for removing a phase error between the two carrier signals having the frequency difference removed therefrom.

However, the phase difference occurs continuously during operation of the receiver too, it is required to carry out the PLL continuously for correcting the phase error during operation of the receiver.

Moreover, though a deviation of the Q signal after an average of DC components of the Q signal is made to be '0' is small if an amplitude of the carrier of the received signal is significantly greater than amplitudes of noises, a deviation of the Q signal is significantly great owing to an influence from the noise though the average of the DC components of the Q signal is '0' if the amplitude of the carrier of the received signal is similar to, or smaller than the amplitude of the noise, to cause frequency jitter, and a poor performance of the receiver due to the Q signal deviation.

SUMMARY OF THE INVENTION

Accordingly, the present invention is directed to a device for recovering a carrier that substantially obviates one or more of the problems due to limitations and disadvantages of the related art.

An object of the present invention is to provide a device for recovering a carrier which can generates a reference carrier close to a carrier of a broadcasting signal received at a receiver.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for recovering a carrier includes a first mixer for changing first passband I, and Q signals to baseband I, Q signals, a filter part for providing pilot components of the baseband I, and Q signals, a first phase error detector for receiving the pilot component to detect first phase error information, a second mixer for changing the first passband I, Q signals to second passband I, Q signals, a second phase error detector for receiving second passband I, Q signals to detect second phase error information, a loop filter for filtering and integrating the first and second phase error information, and first, and second oscillators for producing first and second complex carriers in proportion to an output of the loop filter, and providing to the first and second mixers, respectively.

The first phase error detector includes a delay for delaying the pilot component of the baseband I signal for a preset time period, an error characterizer for extracting a one or more phase-error attributes from a signal received from the delay, and a multiplier for multiplying the baseband I, Q signals.

The second phase error detector includes a first delay for delaying a signal from the second mixer for a preset time period, a second delay for delaying a signal from the first delay for a preset time period, a subtractor for providing a difference of a signal from the second mixer and a signal from the second delay, and a multiplier for multiplying a signal from the first delay and a signal from the subtractor.

The second mixer provides second passband I, Q signals each having a pilot component with an fs/4 (fs denotes a sampling frequency) frequency.

In another aspect of the present invention, there is provided a device for recovering a carrier including a first mixer for multiplying passband I, and Q signals and a first complex carrier to produce baseband I, Q signals, a filter part for providing pilot components of the baseband I, and Q signals only, a first phase error detector for receiving the pilot component to produce first phase error information, a second mixer for multiplying the passband I, Q signals and a second complex carrier, a second phase error detector for multiplying a difference of samples from the second mixer at first and second time points and a sample at a middle time point of the two samples for producing second phase error information, a loop filter for receiving first and second phase error information and selectively forwarding one of the first and second phase error information, and first, and second oscillators for producing the first and second complex carriers in proportion to an output of the loop filter, and providing to the first and second mixers, respectively.

The second phase error detector includes a first delay for delaying a signal from the second mixer for a preset time period, a second delay for delaying a signal from the first delay for a preset time period, a subtractor for providing a difference of a signal from the second mixer and a signal from the second delay, and a multiplier for multiplying a signal from the first delay and a signal from the subtractor. The second phase error detector may further include a filter for providing only the pilot component of the signal from the second mixer to the first delay.

The second mixer provides second passband I, Q signals each having a pilot component with an fs/4 (fs denotes a sampling frequency) frequency.

The loop filter provides the first phase error information in an FLL process in which a frequency of the first complex carrier which is a reference carrier is corrected, and the second phase error information in a PLL process in which a phase of the first complex carrier is corrected.

In further aspect of the present invention, there is provided a device for recovering a carrier including a first mixer for multiplying passband I, and Q signals and a first complex carrier to forward baseband I, Q signals to an outside, a second mixer for multiplying the passband I, Q signals and a second complex carrier, a phase error detector for multiplying a difference of samples from the second mixer at first and second time points and a sample at a middle time point of the two samples for producing phase error information, a loop filter for receiving the phase error information and producing information on a frequency error and a phase error of the first complex carrier, and first, and second oscillators for producing the first and second complex carriers in proportion to an output of the loop filter, and providing to the first and second mixers, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

First Embodiment

In general, a digital TV receiver includes a tuner (not shown) for selecting a particular channel from broadcasting signals received through an antenna (not shown) and converting a signal on the selected channel to an intermediate frequency (IF) signal, an A/D converter for converting the IF signal to a digital signal, a carrier recovering device for removing a frequency error and a phase error between a carrier of the digital signal and a reference carrier of the receiver, and a DC remover for removing a DC component from a signal from the carrier recovering device.

Figure 1:
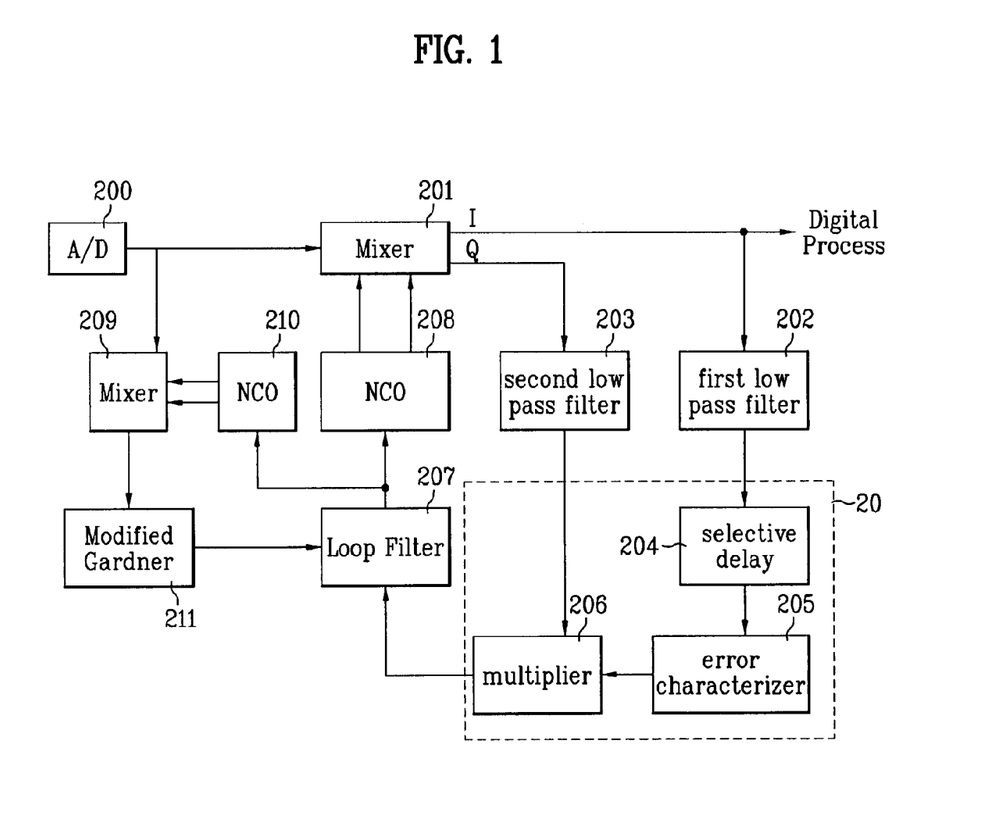
FIG. 1 illustrates a block diagram of a device for recovering a carrier in accordance with a first preferred embodiment of the present invention.

The device for recovering a carrier in accordance with a first preferred embodiment of the present invention will be described. FIG. 1 illustrates a block diagram of a device for recovering a carrier in accordance with a first preferred embodiment of the present invention.

Referring to FIG. 1, there is a first mixer 201 connected to an A/D converter 200 for multiplying first passband I, and Q signals from the A/D converter 200 and a complex carrier (COS, SIN) to provide baseband I, Q signals. There are a first low pass filter 202 for extracting only a pilot component from the baseband I signal and a second low pass filter 203 for extracting only a pilot component from the baseband Q signal, both connected to the first mixer 201. There is a selective delay 204 connected to the first low pass filter 202 for delaying an output from the first low pass filter 202 for a preset time period, and an error characterizer 205 connected to the selective delay 204 for extracting a one or more phase-error attributes from an output of the selective delay 204. There is a multiplier 206 connected to the second low pass filter 203 and the error characterizer 205 for multiplying an output of the second low pass filter 203 and an output of the error characterizer 205 and providing phase error information. The selective delay 204, the error characterizer 205 and the multiplier 206 together form a phase error detector 20.

There are a second mixer 209 connected to the A/D converter 200 for changing the first passband I, Q signals from the A/D converter 200 to second passband I, Q signals, and a phase error detector 211 connected to the second mixer 209 for detecting phase error information from the second mixer 209 by Gardner system. There is a loop filter 207 connected both to the multiplier 206 and the phase error detector 211 for producing frequency and phase error information from outputs of the multiplier 206 and the phase error detector 211.

There are an NCO (Numerically Controlled Oscillator) 208 connected between the loop filter 207 and the first mixer 201 for producing a carrier in proportion to an output of the loop filer 207, and a second NCO 210 connected between the loop filter 207 and the second mixer 209 set to a center frequency different from the first NCO 208 for producing a carrier in proportion to an output of the loop filter 207.

The operation of the device for recovering a carrier of the present invention will be described.

Figure 2:
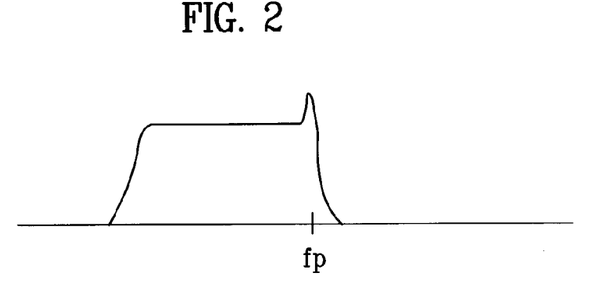
FIG. 2 illustrates a graph showing frequency characteristics of a passband digital signal at an input terminal of a first mixer in FIG. 1.
Figure 3:
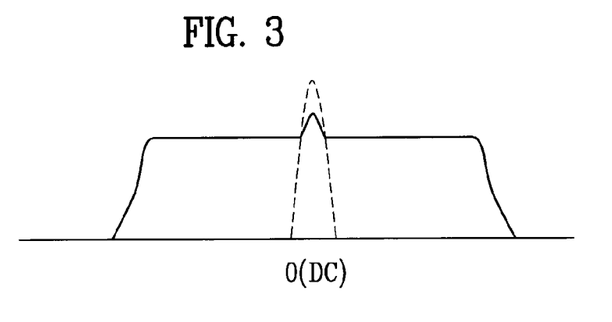
FIG. 3 illustrates a graph showing frequency characteristics of an I signal at an output terminal of a first mixer in FIG. 1.
Figure 4:
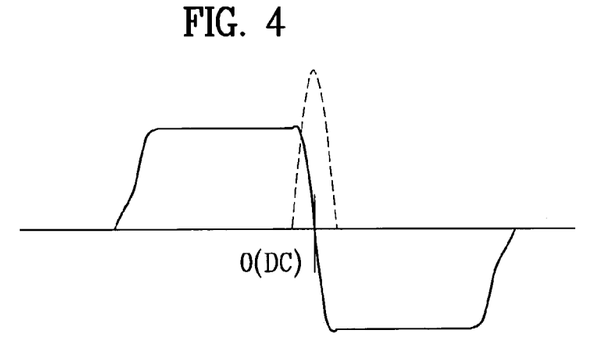
FIG. 4 illustrates a graph showing frequency characteristics of a Q signal at an output terminal of a first mixer in FIG. 1.

FIG. 2 illustrates a graph showing frequency characteristics of a passband digital signal at an input terminal of a first mixer in FIG. 1, FIG. 3 illustrates a graph showing frequency characteristics of an I signal at an output terminal of a first mixer in FIG. 1, and FIG. 4 illustrates a graph showing frequency characteristics of a Q signal at an output terminal of a first mixer in FIG. 1.

The A/D converter 200 provides digitized first passband I, Q signals on a particular channel to the first mixer 201. The first mixer 201 receives a complex carrier, i.e., a sine wave SIN and a cosine wave COS, having carrier recovery made from the first NCO 208 and multiplies with the first passband I, Q signals. The first passband I, Q signals multiplied with the complex carrier transits to baseband I, Q signals.

Referring to FIG. 2, an fp denotes a pilot frequency in the first passband I, Q signals, i.e., a carrier frequency, which is changed to baseband I, Q signals having a DC pilot component, i.e., a pilot component having '0' frequency as shown in FIGS. 3 and 4 once the carrier frequency passes through the first mixer 201.

If frequencies and phases of the carrier signal in the first passband I, Q signals and the reference carrier signal in the first NCO 208 are identical, desired baseband I, Q signals can be produced, exactly. However, in an actual situation, the frequencies and phases of the two carrier signals are not identical due to influences from an error of the NCO, transmission line characteristics, and the like. Therefore, it is required to correct the frequencies and phases which are not identical.

To do this, it is required to extract DC components from the baseband I, Q signals. Accordingly, the baseband I signal is provided from the first mixer 201 to the first low pass filter 202, the baseband Q signal is provided from the first mixer 201 to the second low pass filter 203.

The first, or second low pass filter 202 or 203 may be an IIR (Infinite Impulse Response) filter as one embodiment, which only passes components in regions each marked with a dashed line as shown in FIGS. 3 and 4.

In general, a device for recovering a carrier requires a signal of a frequency close to a pilot frequency in a 6 MHZ bandwidth for recovering the carrier. Therefore, the first and second low pass filters 202 and 203 remove the rest of the frequency components inclusive of data from the baseband I, Q signals for prevention of performance deterioration of the device for recovering a carrier due to the data.

In other words, when the baseband I, Q signals pass the first, and second low pass filters 202 and 203 respectively, only the pilot components are provided. More precisely, the rest of the frequency components excluding DC components, i.e., components close to '0' frequency, are removed. This is because recovery of the carrier is possible only with the DC components.

In other words, when the baseband I, Q signals pass the first, and second low pass filters 202 and 203 respectively, only the pilot components are provided. More precisely, rest of the frequency components excluding DC components, i.e., components close to '0' frequency, are removed. This is because recovery of the carrier is possible only with the DC components.

Then, an output of the first low pass filter 202 is provided to the selective delay 204, for converting the frequency error of the two carriers and subjecting to an FLL process.

The selective delay 204 delays the I signal having the data removed therefrom for a preset time period and provides to the error characterizer 205. In this instance, if the pilot component of the I signal from the first low pass filter 202 is not changed to the DC component having a '0' frequency exactly, the selective delay 204 selectively delays the pilot component of the I signal for a preset time period for producing a phase error in proportion to a frequency difference between the pilot component of the I signal and the DC component of 0 frequency. If there is no difference of frequencies between the pilot component of the I signal and the reference carrier signal, the selective delay 204 does not delay the pilot component of the I signal.

Then, the error characterizer 205 extracts one or more phase-error attributes of the I signal from the selective delay 204 only and provides corresponding signals to the multiplier 206. Then, the multiplier 206 multiplies the one or more phase-error attributes of the I signal and the pilot component of the Q signal, and provides first phase error information.

At the end, the phase error detector 20 composed of the selective delay 204, the error characterizer 205 and the multiplier 206 obtains the phase error information from the baseband I, Q signals passed through the first mixer 201.

Figure 5:
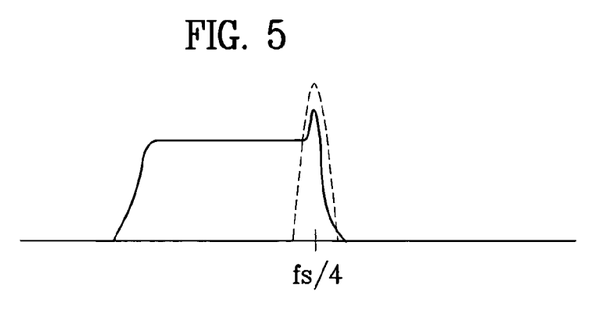
FIG. 5 illustrates a graph showing frequency characteristics of a passband digital signal at an output terminal of a second mixer in FIG. 1.

On the other hand, the second mixer 209 changes the first passband I, Q signals from the A/D converter to a second passband I, Q signals. In other words, the second mixer 209 changes passband digital signal having frequency characteristics like FIG. 2 to another passband digital signal having frequency characteristics like FIG. 5, for enabling application of the Gardner system to the device for recovering a carrier. In FIG. 5, fs/4 denotes a ¼ frequency of a sampling frequency fs used when the A/D converter 200 converts an analog signal to a digital signal.

Then, an output of the second mixer 209 is provided to the phase error detector 211. The phase error detector 211 detects second phase error information from the second passband I, Q signals by the Gardner system, and provides the same to the loop filter 207. Then, the loop filter 207 filters and integrates the first and second phase error information.

Figure 6:
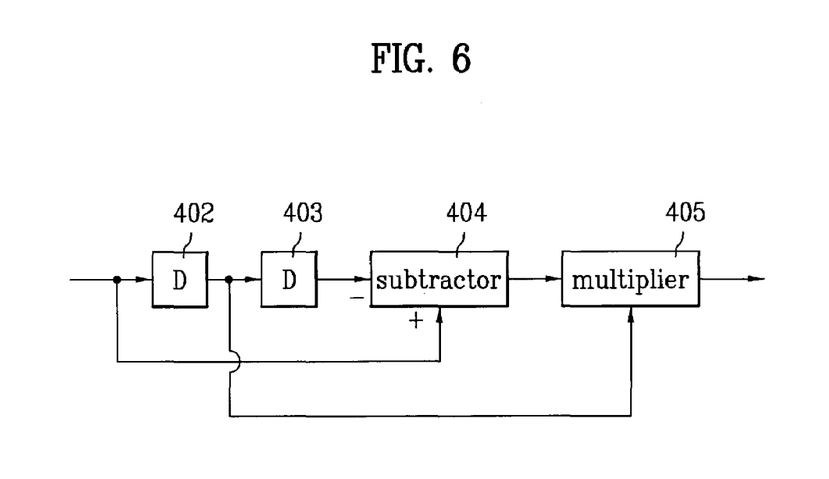
FIG. 6 illustrates a detailed block diagram of one embodiment of a phase error detecting part in FIG. 1.

The phase error detector 211 will be described in detail. FIG. 6 illustrates a detailed block diagram of one embodiment of a phase error detecting part in FIG. 1, and FIG. 7 illustrates a detailed block diagram of another embodiment of a phase error detecting part in FIG. 1.

Referring to FIG. 6, the first embodiment phase error detector 211 includes a first delay 402 for delaying an output (the second passband I, Q signals) sample of the second mixer 209 for a preset time period, a second delay 403 for delaying an output of the first delay 402 for a preset time period, a subtractor 404 for obtaining a difference of outputs of the second delay 403 and the second mixer 409, and a multiplier 405 for multiplying outputs of the subtractor 404 and the first delay 402.

Figure 7:
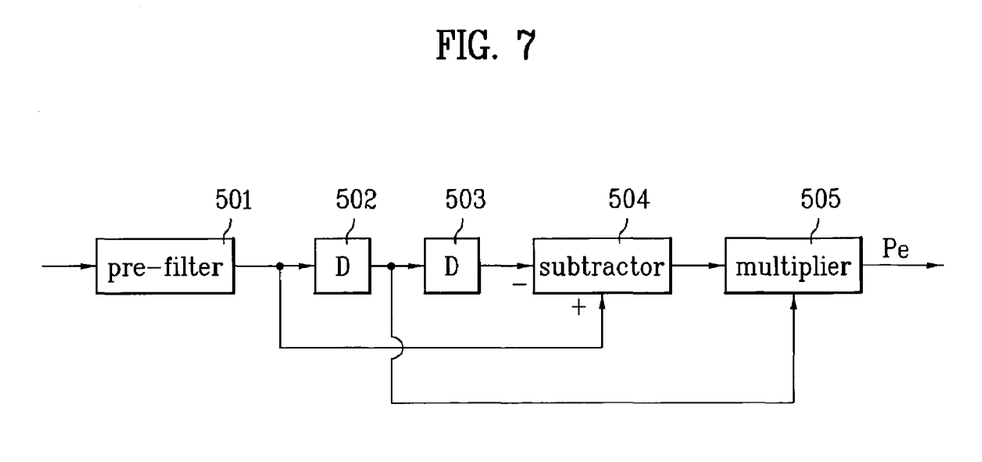
FIG. 7 illustrates a detailed block diagram of another embodiment of a phase error detecting part in FIG. 1.

Referring to FIG. 7, the second embodiment phase error detector 211 includes a pre-filter 501 provided between the second mixer 209 and the first delay 502 additionally for extracting the pilot component only. Inclusion of the pre-filter 501 is a designer's option.

When the second embodiment phase error detector 211 is employed, the second passband I, Q signals from the second mixer 209 are provided to the pre-filter 501, and the pre-filter 501 extracts the pilot component only from an output of the second mixer 209 and provides to the first delay 502. In this instance, a pass frequency of the pre-filter 501 has a form marked with a dashed line in FIG. 5. That is, when the output of the second mixer 209 is passed through the pre-filter 501, most of data component is removed, only leaving a frequency (pilot component) component of the carrier.

The first delay 502 delays an output of the pre-filter 501 for a preset time period and provides to the second delay 503, and the second delay 503 delays an output of the first delay 502 for a preset time period and provides to the subtractor 504.

Thereafter, the subtractor 504 obtains a difference of an output of the pre-filter 501 and an output of the second delay 503 and provides to the multiplier 505, and the multiplier 505 multiplies an output of the first delay 502 and an output of the subtractor 504 and provides second phase error (Pe) information.

The second phase error (Pe) information from the second embodiment phase error detector 211 is expressed in an equation 1 shown below.

$$Pe(t)=d(t-1)*\{d(t)-d(t-2)\},$$

Where, Pe(t) denotes a second phase error at a time point t, d(t) denotes an output of the pre-filter 501 at a time point t, and d(t-1) and d(t-2) are outputs of the pre-filter 501 at time points one sample and two samples prior to the time point d(t) respectively.

Then, the loop filter 207 receives the first phase error information from the multiplier 206 and the second phase error information from the phase error detector 211, produces information on frequencies and phase errors between the two carriers and provided to the first and second NCO 208 and 210. Center frequencies of the first, and second NCOs 208 and 210 are set to be different from each other for obtaining desired outputs from the first and second mixers 201 and 209.

The first phase error information from the multiplier 206 is phase error information for making the DC component of the baseband Q signal to be '0', and second phase error information detected at the phase error detector 211 is phase error information for positioning a carrier frequency, i.e., a pilot component, present in an output of the second mixer 209 to be at fs/4 exactly. A phase error of the second phase error information is extracted, not from a size of a signal, but a position of the carrier signal crossing '0' at fs/4.

The present FPLL system which extracts phase error information in general from a size of a signal is influenced from a Gaussian noise, a gain change of an input signal, and the like. However, the phase error of the Gardner system which extracts the phase error information from a position the carrier signal crosses '0' (zero crossing) has almost no influence from the Gaussian noise, particularly, gain change of the input signal.

Therefore, if there is heavy distortion of the transmission channel or momentary deterioration of the channel during operation of the receiver, the second phase error information extracted by Gardener system is accurate more than the first phase error information from the multiplier 206. Accordingly, in recovery of the carrier, a more stable performance of the receiver can be secured if the first phase error information is used in the FLL process when a frequency difference between a signal received initially (a carrier in the first passband I, Q signals) and the reference carrier in the device for recovering a carrier, and the second phase error information extracted by the Gardner system is used in the PLL process when a phase difference of the two carriers are corrected.

Moreover, the frequency difference between the two carriers can also be corrected by using the phase error information extracted by the Gardener system.

Figure 8:
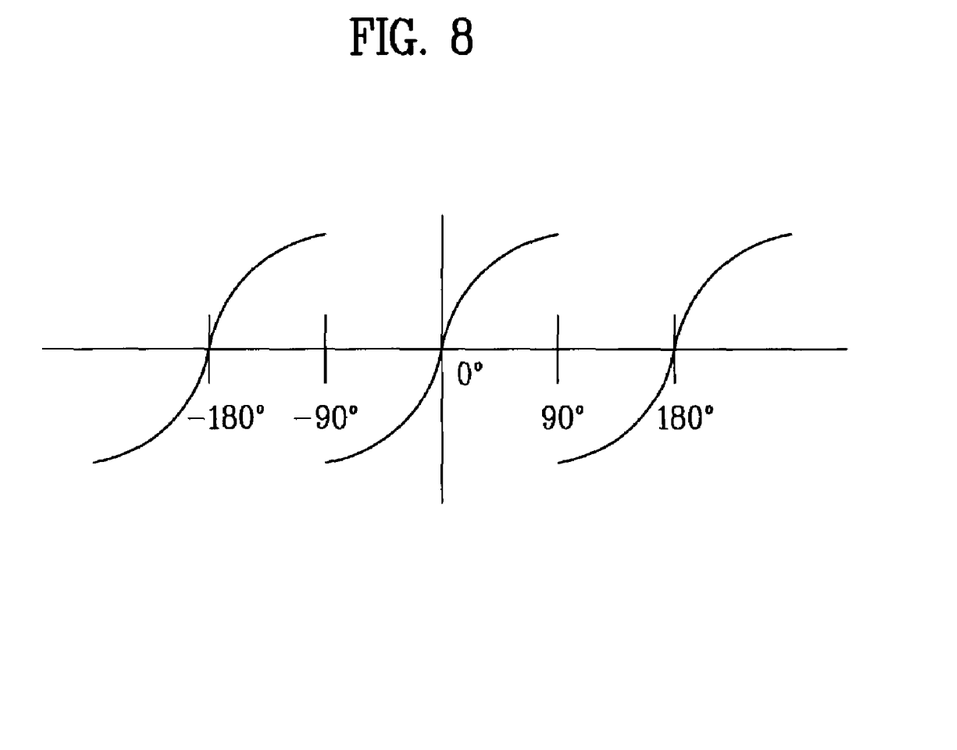
FIG. 8 illustrates a graph showing S-curve characteristics of a phase error in a PLL process in an FPLL.
Figure 9:
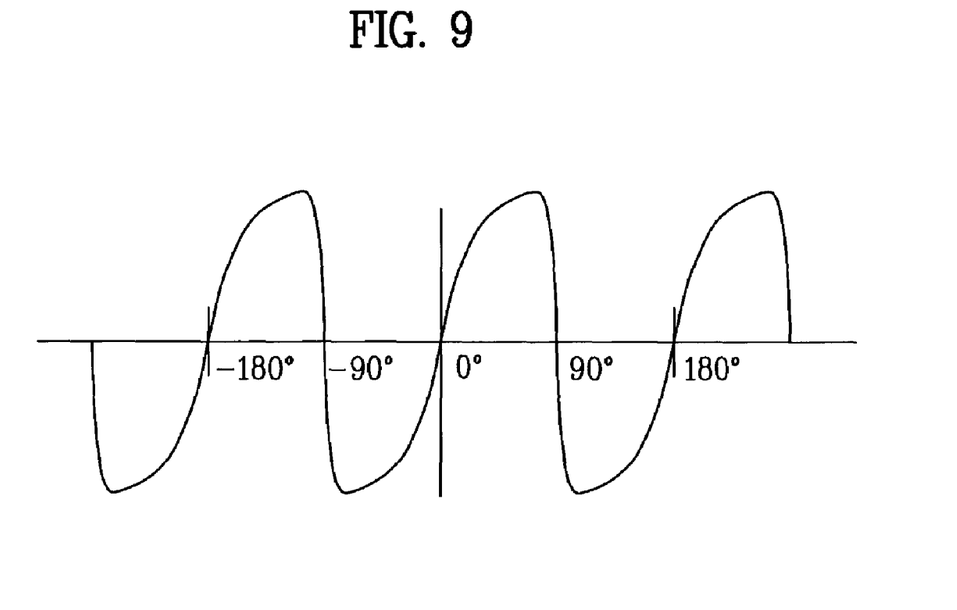
FIG. 9 illustrates a graph showing S-curve characteristics of a phase error by a Gardener system.

FIGS. 8 and 9 illustrate graphs showing S-curve characteristics of the two kinds of phase error information, wherein FIG. 8 illustrates S-curve characteristics of the first phase error information. As shown in FIG. 8, since the first phase error information has biphase stable characteristics in which a phase converges at 0° and 180°, phase error information between −90°~90° can be obtained in the PLL process. FIG. 9 illustrates a graph showing S-curve characteristics of a second phase error information extracted by a Gardener system, wherein it can be known that since the phase error information between −90°~90° is obtainable from the Gardner system phase information too, a carrier can be recovered from the Gardner system phase information, which has a phase difference in a range similar to the carrier recovered by using the first phase error.

Moreover, the present invention is applicable, not only to a receiver of the VSB system, but also to a receiver of the QAM system.

Second Embodiment

Figure 10:
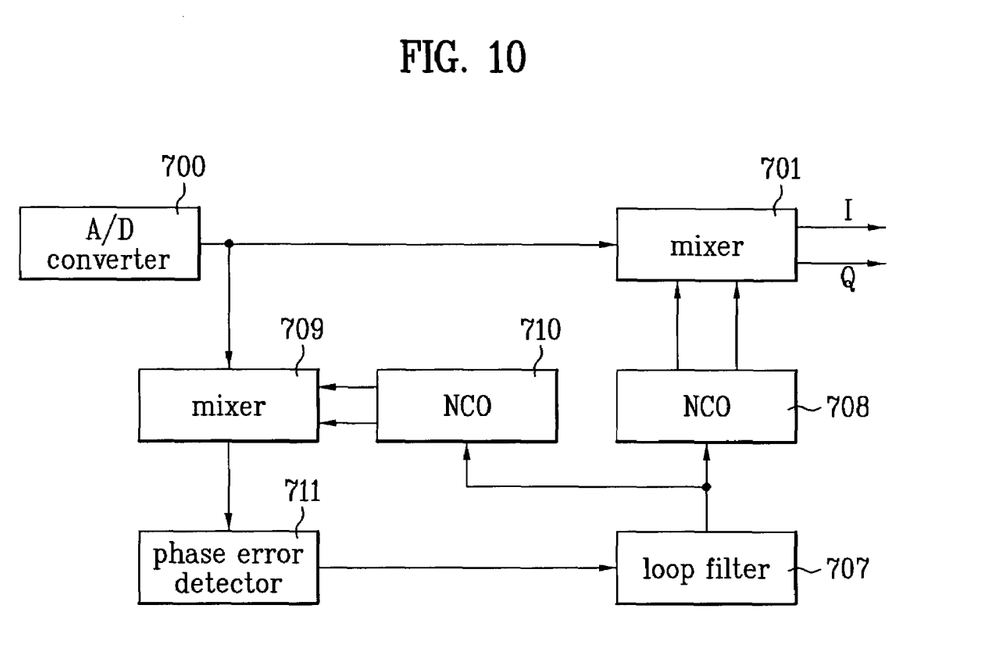
FIG. 10 illustrates a block diagram of a device for recovering a carrier in accordance with a second preferred embodiment of the present invention.

FIG. 10 illustrates a block diagram of a device for recovering a carrier in accordance with a second preferred embodiment of the present invention.

Referring to FIG. 10, there is a first mixer 701 connected to an A/D converter 700 for multiplying first passband I, Q signals from the A/D converter 700 and a complex carrier (COS, SIN) to provide baseband I, Q signals.

There are also a second mixer 709 connected to the A/D converter 700 for converting the first passband I, Q signals from the A/D converter 700 into second passband I, Q signals, and a phase error detector 711 connected to the second mixer 709 for detecting phase error information from an output of the second mixer 709 by the Gardner system. There is a loop filter 707 for producing information on a frequency and a phase error from an output of the phase error detector 711.

There are a first NCO 708 connected between the loop filter 707 and the first mixer 701 for producing a carrier in proportion to an output of the loop filter 707, and a second NCO 710 connected between the loop filter 707 and the second mixer 709 and set to a center frequency different from the first NCO 708 for producing a carrier in proportion to an output of the loop filter 707.

The second embodiment device for recovering a carrier has a system identical to the first embodiment excluding the first and second low pass filters 202 and 203, the selective delay 204, the error characterizer 205, and the multiplier 206. Operation of elements of the second embodiment device is the same with the first embodiment device.

Accordingly, for compensating a frequency error and a phase error between two carriers, the second embodiment device for recovering a carrier uses, not phase error information in proportion to a difference of frequencies between two carriers, but phase error information extracted by the Gardner system, simply.

As has been described, the device for recovering a carrier can produce a reference carrier more stable and closer to a frequency of a signal from an A/D converter, by using phase error information extracted from a frequency difference between a carrier in a broadcasting signal, and a reference carrier, and phase error information extracted by the Gardner system, i.e., extracted from a passband signal having a frequency with an fs/4 component.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A device for recovering a carrier comprising:
    a first mixer for changing first passband I, and Q signals to baseband I, Q signals;
    a filter part for providing pilot components of the baseband I, and Q signals;
    a first phase error detector for receiving the pilot components to detect first phase error information;
    a second mixer for changing the first passband I, Q signals to second passband I, Q signals;
    a second phase error detector for receiving the second passband I, Q signals to detect second phase error information;
    a loop filter for filtering and integrating the first and second phase error information; and
    first and second oscillators for producing first and second complex carriers in proportion to an output of the loop filter and providing the same to the first and second mixers, respectively.

2. The device as claimed in claim 1, wherein the first mixer multiplies the first complex carrier to the first passband I, Q signals.

3. The device as claimed in claim 1, wherein the first phase error detector provides the first phase error information in proportion to a frequency difference between the pilot component and the first complex carrier.

4. The device as claimed in claim 1, wherein the first phase error detector includes:
    a selective delay for selectively delaying the pilot component of the baseband I signal,
    a phase-error characterizer for extracting one or more phase-error attributes from a signal received from the selective delay, and
    a multiplier for multiplying the pilot component of the baseband Q signal and the one or more phase-error attributes.

5. The device as claimed in claim 1, wherein the second mixer multiplies the second complex carrier to the first passband I, Q signals.

6. The device as claimed in claim 1, wherein the second mixer provides second passband I, Q signals each having a pilot component with an fs/4 (fs denotes a sampling frequency) frequency.

7. The device as claimed in claim 1, wherein the second phase error detector includes;
    a first delay for delaying a signal from the second mixer for a preset time period,
    a second delay for delaying a signal from the first delay for a preset time period,
    a subtractor for providing a difference of a signal from the second mixer and a signal from the second delay, and
    a multiplier for multiplying a signal from the first delay and a signal from the subtractor.

8. The device as claimed in claim 7, wherein the second phase error detector further includes a filter for providing the pilot component of the signal from the second mixer to the first delay.

9. The device as claimed in claim 1, wherein the filter part includes;
    a first low pass filter for providing the pilot component of the baseband I signal only, and
    a second low pass filter for providing the pilot component of the baseband Q signal only.

10. A device for recovering a carrier comprising:
    a first mixer for multiplying passband I, and Q signals and a first complex carrier to produce baseband I, Q signals;
    a filter part for providing pilot components of the baseband I, and Q signals only;
    a first phase error detector for receiving the pilot component to produce first phase error information;
    a second mixer for multiplying the passband I, Q signals and a second complex carrier;
    a second phase error detector for multiplying a difference of samples from the second mixer at first and second time points and a sample at a middle time point of the two samples for producing second phase error information;
    a loop filter for receiving first and second phase error information and selectively forwarding one of the first and second phase error information; and
    first, and second oscillators for producing the first and second complex carriers in proportion to an output of the loop filter, and providing to the first and second mixers respectively.

11. The device as claimed in claim 10, wherein the first phase error detector provides the first phase error information in proportion to a difference of frequencies between the pilot component of the baseband I signal and a DC component with '0' frequency.

12. The device as claimed in claim 10, wherein the first phase error detector includes;
    a selective delay for selectively delaying the pilot component of the baseband I signal for a present time period,
    a phase-error characterizer for extracting a one or more phase-error attributes from a signal received from the delay, and
    a multiplier for multiplying the baseband I, Q signals.

13. The device as claimed in claim 10, wherein the second mixer provides passband I, Q signals each having a pilot component with an fs/4 (fs denotes a sampling frequency) frequency.

14. The device as claimed in claim 10, wherein the second phase error detector includes;
    a first delay for delaying a signal from the second mixer for a preset time period,
    a second delay for delaying a signal from the first delay for a preset time period,
    a subtractor for providing a difference of a signal from the second mixer and a signal from the second delay, and
    a multiplier for multiplying a signal from the first delay and a signal from the subtractor.

15. The device as claimed in claim 14, wherein the second phase error detector further includes a filter for providing only the pilot component of the signal from the second mixer to the first delay.

16. The device as claimed in claim 10, wherein the filter part includes;
    a first low pass filter for providing the pilot component of the baseband I signal only, and
    a second low pass filter for providing the pilot component of the baseband Q signal only.

17. The device as claimed in claim 10, wherein the loop filter provides the first phase error information in an FLL process in which a frequency of the first complex carrier which is a reference carrier is corrected, and the second phase error information in a PLL process in which a phase of the first complex carrier is corrected.

18. The device as claimed in claim 10, wherein the first and second oscillators have center frequencies different from each other.

19. A device for recovering a carrier comprising:
- a first mixer for multiplying passband I, and Q signals and a first complex carrier to forward baseband I, Q signals to an output;
- a second mixer for multiplying the passband I, Q signals and a second complex carrier;
- a phase error detector for multiplying a difference of samples from the second mixer at first and second time points and a sample at a middle time point of the two samples for producing phase error information;
- a loop filter for receiving the phase error information and producing information on a frequency error and a phase error of the first complex carrier; and
- first, and second oscillators for producing the first and second complex carriers in proportion to an output of the loop filter, and providing to the first and second mixers, respectively.

20. The device as claimed in claim 19, wherein the second mixer provides passband I, Q signals each having a pilot component with an fs/4 (fs denotes a sampling frequency) frequency.

21. The device as claimed in claim 19, wherein the phase error detector includes;
- a first delay for delaying a signal from the second mixer for a preset time period,
- a second delay for delaying a signal from the first delay for a preset time period,
- a subtractor for providing a difference of a signal from the second mixer and a signal from the second delay, and
- a multiplier for multiplying a signal from the first delay and a signal from the subtractor.

22. The device as claimed in claim 19, wherein the phase error detector further includes a filter for providing only the pilot component of the signal from the second mixer to the first delay.

* * * * *